(12) United States Patent  (10) Patent No.: US 7,394,957 B1
Craig  (45) Date of Patent: Jul. 1, 2008

(54) FIBEROPTIC CABLE BEAD MARK SYSTEM AND METHOD

(76) Inventor: Shirley Craig, 13237 Branchville Rd., Spring Hill, FL (US) 34609

( * ) Notice: Subject to any disclaimer, the term of this patent is extended or adjusted under 35 U.S.C. 154(b) by 0 days.

(21) Appl. No.: 11/702,968

(22) Filed: Feb. 6, 2007

(51) Int. Cl.
  *G02B 6/44* (2006.01)
  *G02B 6/00* (2006.01)
(52) U.S. Cl. ............ 385/100; 385/109; 385/110; 385/114; 385/134; 385/147
(58) Field of Classification Search ........... 385/100, 385/109, 110, 114, 134, 147
  See application file for complete search history.

(56) References Cited

U.S. PATENT DOCUMENTS

| | | | |
|---|---|---|---|
| 1,373,416 A | 4/1921 | Everett | |
| 5,529,513 A | 6/1996 | Lee | |
| 5,807,139 A | 9/1998 | Volansky | |
| 2005/0213901 A1* | 9/2005 | Cook | 385/102 |

\* cited by examiner

*Primary Examiner*—Frank G Font
*Assistant Examiner*—Jerry Blevins
(74) *Attorney, Agent, or Firm*—Louis J. Brunoforte

(57) ABSTRACT

A plurality of fiberoptic strands is provided. Each fiberoptic strand has a free end. A plurality of groups is provided. Each group is formed of a plurality fiberoptic strands. A plurality of beads is provided. Each bead has a generally cylindrical configuration. Each bead has an exterior diameter, an interior diameter and an axial length. The beads have exterior surfaces. The exterior surfaces are of different colors. In this manner intended functions are designated.

6 Claims, 4 Drawing Sheets

| | |
|---|---|
| 1 | Blue |
| 2 | Orange |
| 3 | Green |
| 4 | Brown |
| 5 | Slate |
| 6 | White |
| 7 | Red |
| 8 | Black |
| 9 | Yellow |
| 10 | Violet |
| 11 | Rose |
| 12 | Aqua | s 13-24
Colors 1-12 are repeated
with silver tracer mark.
(marker included in kit)

— 58

56

FIBEROPTIC CABLE BEAD MARK SYSTEM AND METHOD

BACKGROUND OF THE INVENTION

1. Field of the Invention

The present invention relates to a fiberoptic cable bead mark system and method and more particularly pertains to the locating and identifying and marking of fiberoptic strands in an accurate and efficient manner.

2. Description of the Prior Art

The use of marking systems of known designs and configurations is known in the prior art. More specifically, marking systems of known designs and configurations previously devised and utilized for the purpose of marking through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 1,373,416 issued Apr. 5, 1921 to Everett relates to a Tag and Terminal Strip. U.S. Pat. No. 5,529,513 issued Jun. 25, 1996 to Lee relates to a Cable Connector having Removable Coded Rings. U.S. Pat. No. 5,807,139 issued Sep. 15, 1998 to Volansky relates to a Surface Mount Multimedia Outlet.

While these devices fulfill their respective, particular objectives and requirements, the aforementioned patents do not describe a fiberoptic cable bead mark system and method that allows locating and identifying and marking fiberoptic strands in an accurate and efficient manner.

In this respect, the fiberoptic cable bead mark system and method according to the present invention substantially departs from the conventional concepts and designs of the prior art, and in doing so provides an apparatus primarily developed for the purpose of locating and identifying and marking fiberoptic strands in an accurate and efficient manner.

Therefore, it can be appreciated that there exists a continuing need for a new and improved fiberoptic cable bead mark system and method which can be used for locating and identifying and marking fiberoptic strands in an accurate and efficient manner. In this regard, the present invention substantially fulfills this need.

SUMMARY OF THE INVENTION

In view of the foregoing disadvantages inherent in the known types of marking systems of known designs and configurations now present in the prior art, the present invention provides an improved fiberoptic cable bead mark system and method. As such, the general purpose of the present invention, which will be described subsequently in greater detail, is to provide a new and improved fiberoptic cable bead mark system and method which has all the advantages of the prior art and none of the disadvantages.

To attain this, the present invention essentially comprises a fiberoptic cable bead mark system and method. First provided is a plurality of fiberoptic strands. Each strand has a free end. The strands have exterior surfaces. The exterior surfaces are of different colors. In this manner intended functions are designated.

A plurality of groups is provided. Each group is formed of a plurality of fiberoptic strands.

A plurality of cases is provided next. Each case is formed of a plurality of groups of fiberoptic strands.

Provided next is a plurality of beads. Each bead is provided in a generally cylindrical configuration. Each bead has an exterior diameter. The exterior diameter is between about 4.0 millimeters and 6.0 millimeters, preferably about 5.16 millimeters. Each bead has an interior diameter. The interior diameter is between about 2.0 millimeters and 4.0 millimeters, preferably about 3.18 millimeters. Each bead has an axial length. The axial length is between about 4.0 millimeters and 6.0 millimeters, preferably about 5.16 millimeters. The beads have exterior surfaces. The exterior surfaces are of different colors. In this manner intended functions are designated.

The plurality of beads includes a first bead. A first group of fiberoptic strands is provided. The first bead is of a first color. The first bead encompasses the specific first group of fiberoptic strands adjacent to their free ends. The free ends are adapted to be fusion spliced. The plurality of beads includes a second bead. A second group of fiberoptic strands is provided. The second bead is of the first color. The second bead encompasses the specific second group of fiberoptic strands adjacent to their free ends. The free ends of the second specific group are adapted to be fusion spliced to the free ends of the first specific group. The first and second beads are retained respectively on the first and second specific groups of fiberoptic strands prior to the fusion splicing of the first and second specific groups and also after the fusion splicing of the first and second specific groups. A fusion line is provided. The fusion line is provided between the beads of the groups after the fusion splicing.

Further provided is a splice tray. The splice tray is formed with an operational surface. The operational surface is at an angle of about 30 degrees with respect to the horizontal. The operational surface has a transverse recesses. Each recess has a major section. The major section has a smaller arcuate cross section. The smaller arcuate cross section receives a group of fiberoptic strands. A laterally extending minor section is provided. The minor section has a larger arcuate cross section. The larger arcuate cross section receives a bead of a group of fiberoptic strands. The splice tray is adapted to support and separate a plurality of groups. Each group has fiberoptic strands and a bead.

Provided last is a kit. The kit facilitates the locating and identifying and marking of fiberoptic groups. The kit includes a box. The box has twelve smaller compartments. Each compartment contains a plurality of beads of a specific color. Each compartment has a single larger compartment. A tweezers is provided for handling beads. An instruction sheet is provided. The instruction sheet includes a color chart for the beads. A marker is provided for marking beads to extend their utility.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fiberoptic cable bead mark system which has all of the advantages of the prior art marking systems of known designs and configurations and none of the disadvantages.

It is another object of the present invention to provide a new and improved fiberoptic cable bead mark system which may be easily and efficiently manufactured and marketed.

It is further object of the present invention to provide a new and improved fiberoptic cable bead mark system which is of durable and reliable constructions.

An even further object of the present invention is to provide a new and improved fiberoptic cable bead mark system which is susceptible of a low cost of manufacture with regard to both materials and labor, and which accordingly is then susceptible of low prices of sale to the consuming public, thereby making such fiberoptic cable bead mark system economically available to the buying public.

Even still another object of the present invention is to provide a fiberoptic cable bead mark system and method for locating and identifying and marking of fiberoptic strands in an accurate and efficient manner.

Lastly, it is an object of the present invention to provide a new and improved fiberoptic cable bead mark system and method. A plurality of fiberoptic strands is provided. Each fiberoptic strand has a free end. A plurality of groups is provided. Each group is formed of a plurality fiberoptic strands. A plurality of beads is provided. Each bead has a generally cylindrical configuration. Each bead has an exterior diameter, an interior diameter and an axial length. The beads have exterior surfaces. The exterior surfaces are of different colors. In this manner intended functions are designated.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
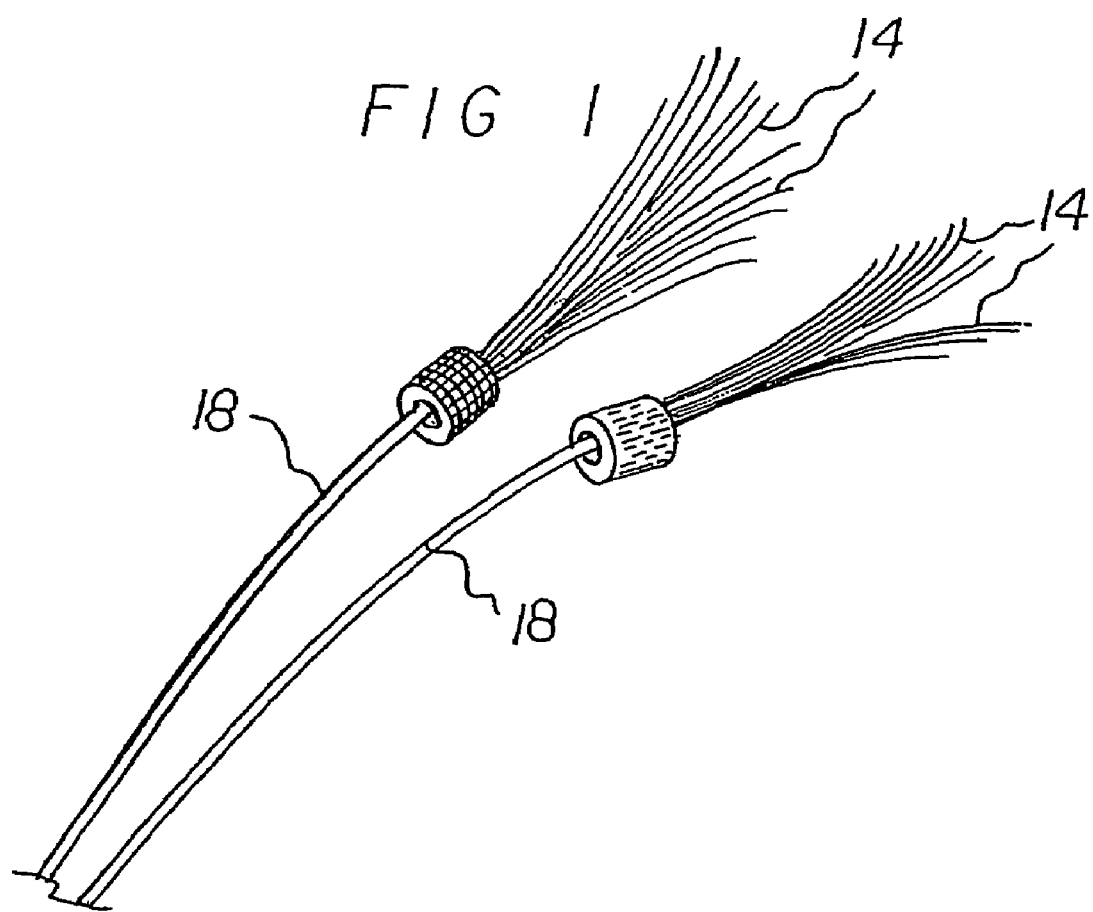
FIG. 1 is a perspective illustration of a pair of groups of fiberoptic strands to be fused to fiberoptic strands of other groups.
Figure 2:
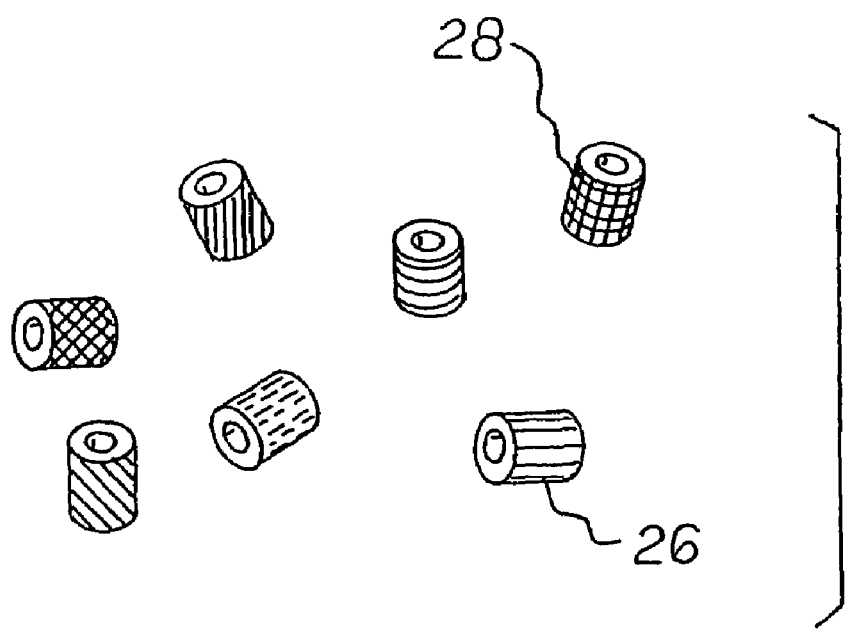
FIG. 2 is a perspective illustration of a plurality of beads used for marking groups of groups of fiberoptic strands.

With reference now to the drawings, and in particular to FIGS. 1, 5, 6 and 7 thereof, the preferred embodiment of the new and improved fiberoptic cable bead mark system and method embodying the principles and concepts of the present invention and generally designated by the reference numeral 10 will be described. Note FIG. 5.

The present invention, the fiberoptic cable bead mark system and method 10 is comprised of a plurality of components. Such components in their broadest context include a plurality of fiberoptic strands, a plurality of groups, and a plurality of beads. Such components are individually configured and correlated with respect to each other so as to attain the desired objective.

First provided is a plurality of fiberoptic strands 14. Each strand has a free end. The strands have exterior surfaces. The exterior surfaces are of different colors. In this manner intended functions are designated.

A plurality of groups 18 is provided. Each group is formed of a plurality of fiberoptic strands.

A plurality of cases 22 is provided next. Each case is formed of a plurality of groups of fiberoptic strands.

Provided next is a plurality of beads 26, 28. Each bead is provided in a generally cylindrical configuration. Each bead has an exterior diameter. The exterior diameter is between about 4.0 millimeters and 6.0 millimeters, preferably about 5.16 millimeters. Each bead has an interior diameter. The interior diameter is between about 2.0 millimeters and 4.0 millimeters, preferably about 3.18 millimeters. Each bead has an axial length. The axial length is between about 4.0 millimeters and 6.0 millimeters, preferably about 5.16 millimeters. The beads have exterior surfaces. The exterior surfaces are of different colors. In this manner intended functions are designated.

The plurality of beads includes a first bead 26A. A first group 18A of fiberoptic strands is provided. The first bead is of a first color. The first bead encompasses the specific first group 18A of fiberoptic strands adjacent to their free ends. The free ends are adapted to be fusion spliced. The plurality of beads includes a second bead 26B. A second group 18B of fiberoptic strands is provided. The second bead is of the first color. The second bead encompasses the specific second group 18B of fiberoptic strands adjacent to their free ends. The free ends of the second specific group are adapted to be fusion spliced to the free ends of the first specific group. The first and second beads are retained respectively on the first and second specific groups of fiberoptic strands prior to the fusion splicing of the first and second specific groups and also after the fusion splicing of the first and second specific groups. A fusion line 32 is provided. The fusion line is provided between the beads of the groups after the fusion splicing.

Further provided is a splice tray 36. The splice tray is formed with an operational surface 38. The operational surface is at an angle of about 30 degrees with respect to the horizontal. The operational surface has a transverse recesses 40. Each recess has a major section 42. The major section has a smaller arcuate cross section. The smaller arcuate cross section receives a group of fiberoptic strands. A laterally extending minor section 44 is provided. The minor section has a larger arcuate cross section. The larger arcuate cross section receives a bead of a group of fiberoptic strands. The splice tray is adapted to support and separate a plurality of groups. Each group has fiberoptic strands and a bead.

Provided last is a kit 48. The kit facilitates the locating and identifying and marking of fiberoptic groups. The kit includes a box 50. The box has twelve smaller compartments 52. Each compartment contains a plurality of beads of a specific color. Each compartment has a single larger compartment 54. A tweezers 56 is provided for handling beads. An instruction sheet 58 is provided. The instruction sheet includes a color chart for the beads. A marker 60 is provided for marking beads to extend their utility.

The present invention also includes the method of marking fiberoptic cable.

The first step is providing a plurality of fiberoptic strands 14. Each fiberoptic strand has a free end.

The next step is providing a plurality of groups 18. Each group is formed of a plurality fiberoptic strands.

The next step is providing a plurality of beads 26, 28. Each bead has a generally cylindrical configuration. Each bead has an exterior diameter, an interior diameter and an axial length. The beads have exterior surfaces. The exterior surfaces are of different colors. In this manner different intended functions are designated.

The next step is encompassing a specific first group 18A of fiberoptic strands to be fusion spliced with a first colored bead 26A. The first colored bead is of a first color.

The next step is encompassing a specific second group 18B of fiberoptic strands to be fusion spliced with a second colored bead 26B. The second colored bead is of the first color.

The last step is retaining first and second beads on the first and second groups of fiberoptic strands during fusion splicing of the ends of the first and second groups of fiberoptic strands. A fusion line 32 is formed between the first and second beads of the fusion spliced groups of strands.

Figures 3, 4:
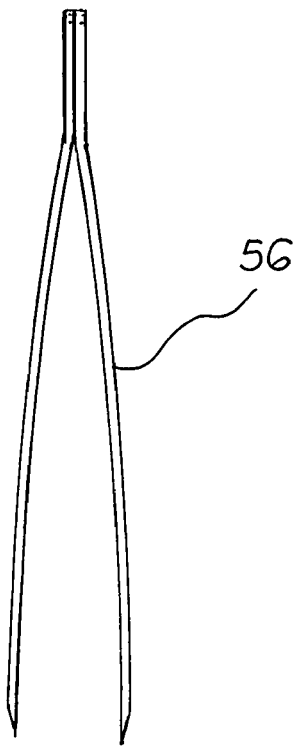
FIG. 3 is a chart of colors adapted to be utilized on the beads illustrated in FIGS. 1 and 2. The system uses the industry standard color code based on TIA/EIA598 "Optical Fiber Cable Color Coding" adopted by the Insulated Cable Engineers Association, Inc. (ICEA) S-87-640 "Standard for Fiber Optic Outside Plant Communications Cable," S-83-596, "Standard for Fiber Optic Premises Distribution Cable," and S-104-696, "Standard for Indoor-Outdoor Optical Fiber Cable."
FIG. 4 is a front elevational view of a tweezers for handling the beads of FIGS. 1 and 2.
Figure 5:
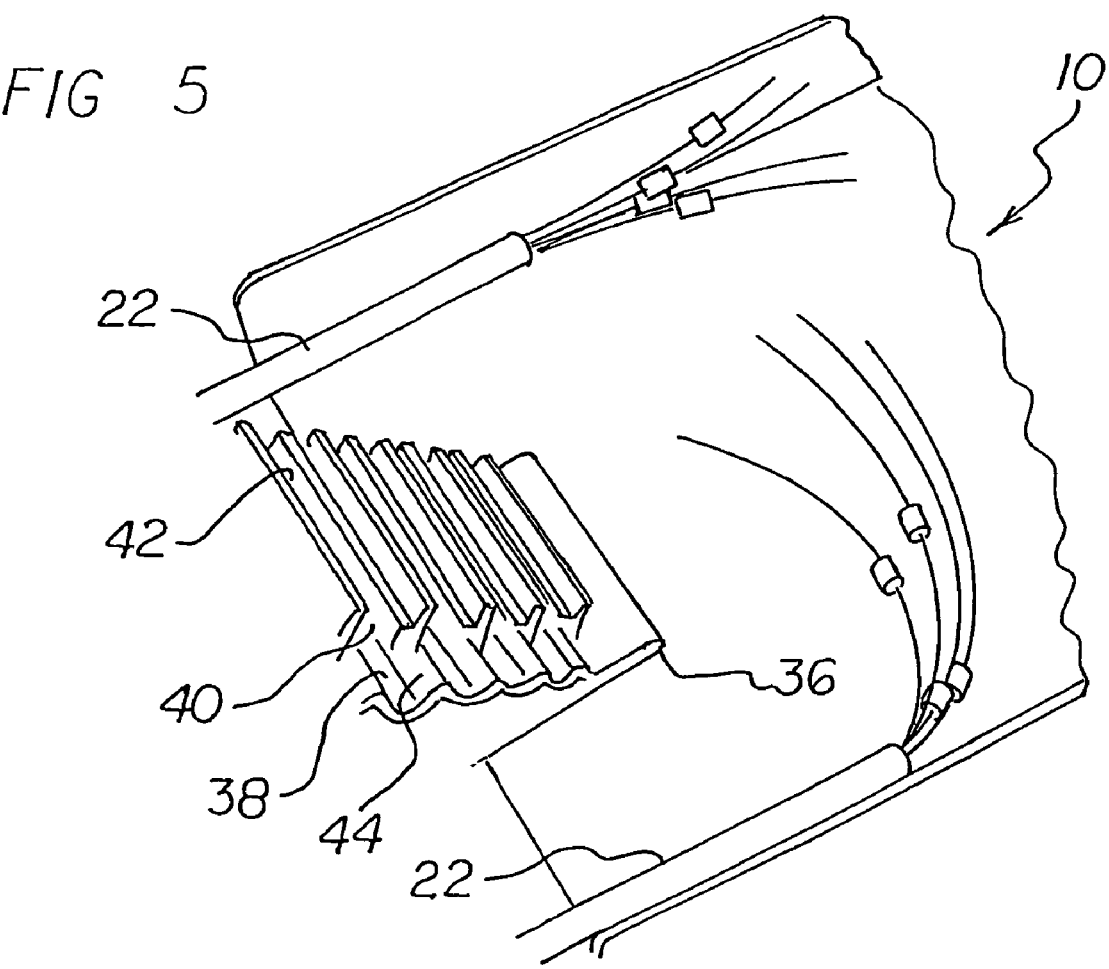
FIG. 5 is a perspective illustration of a splice tray for supporting groups of fiberoptic strands and also illustrating two cases, each case housing a group of groups of fiberoptic strands.
Figure 6:
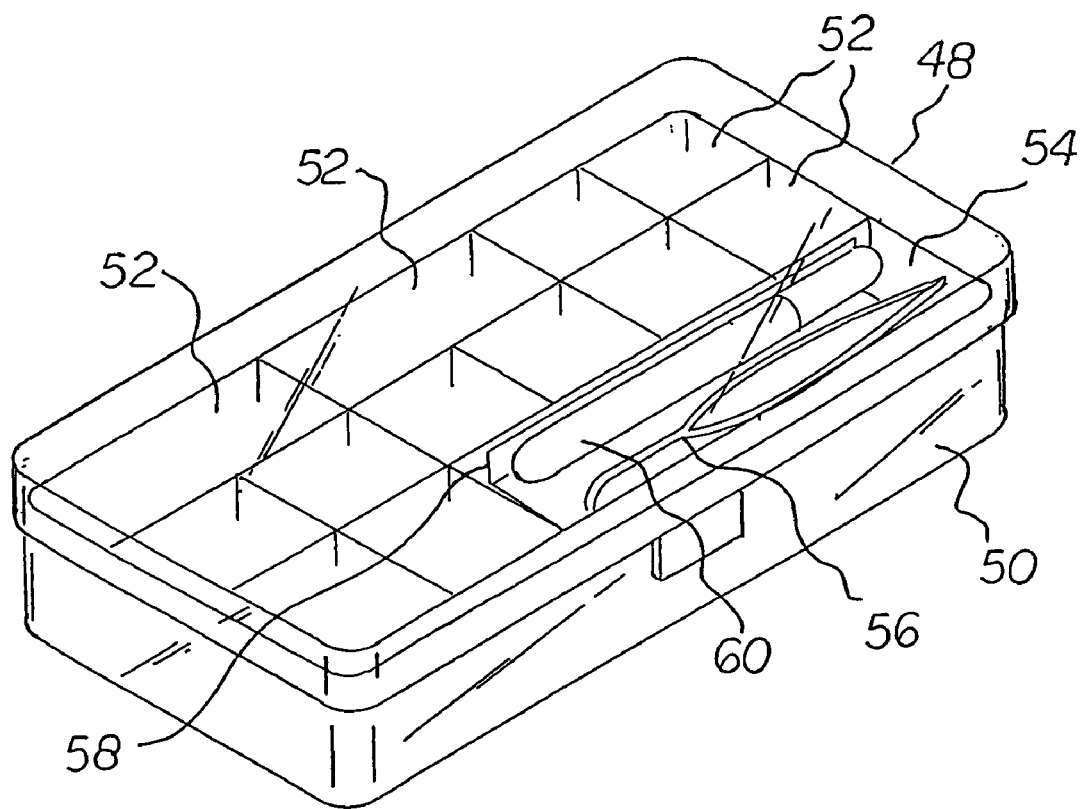
FIG. 6 is a perspective illustration of a kit containing beads sorted by color along with a tweezers and a marker and instruction sheet.
Figure 7:
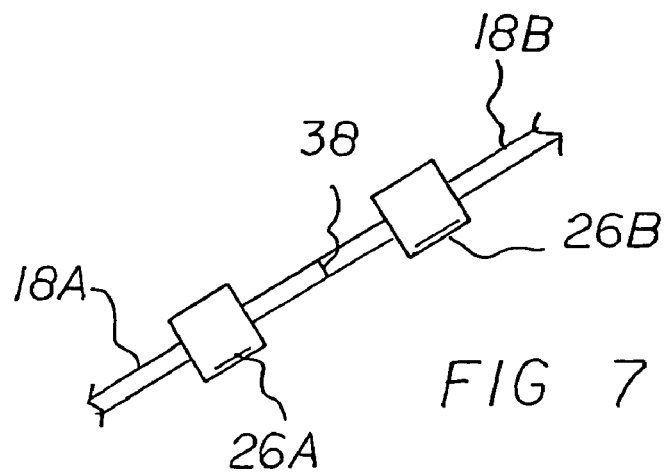
FIG. 7 is a side elevational view of two groups of fiberoptic strands after being spliced.

Fiber optic cable comes in varying sizes containing bundles of fibers. Each group has 12 strands of fibers. The groups are identified by the manufacturer in various manners, using the industry standard color code. Note FIG. 3. Sometimes the groups are covered in a tight colored sheath. Sometimes a colored thread is wrapped around the group in a spiral fashion.

In order for splicing to take place, these coverings or threads must be removed from the fibers and the groups are pulled into a splicing tray, re-identified and marked. The fibers must be cleaned with special solvents to ensure proper bonding.

To date, technicians have been left to improvise this procedure with several less than perfect options. They have retied colored threads, that they saved, around the groups. They have also used sticky tapes or tags. The fibers come packed in a gel which must be cleaned off with fiber cleaning solvents. Often the improvised markings become unstuck or illegible when the fiber cleaning solvents are used.

When using the present invention, the technician identifies a group of fibers and then simply slides the appropriate colored bead marker onto the group of fibers. The splice tray is kept neat and organized. It is now possible to see at a glance which group is which, without fumbling for threads or damaged and degraded sticky tags.

Often, not all the groups in a cable are needed during a splicing job. When the technician uses the bead markers to identify the unused groups of fibers, any other technician entering the splice at a later date to add into the splice is saved the time and difficulty of trying to figure out which group is which. This is because the other technician entering the splice later can see the colored markers at a glance.

The beads themselves are hard plastic and measure, in the preferred embodiment, 5.16 mm. high, 5.16 mm. in diameter with a 3.18 mm. opening. There are approximately 2600 beads in the various colors in each kit, 300 each of blue and orange, and 200 each of the remaining 10 colors.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fiberoptic cable marking system comprising: a plurality of fiberoptic strands, each fiberoptic strand having a free end; a plurality of groups, each group being formed of a plurality fiberoptic strands; and a plurality of beads, each bead having a generally cylindrical configuration with an exterior diameter and an interior diameter and an axial length, the beads having exterior surfaces of different colors to designate different intended functions wherein the beads have an exterior diameter of between about 4.0 millimeters and 6.0 millimeters, an interior diameter of between about 2.0 millimeters and 4.0 millimeters, and an axial length of between about 4.0 millimeters and 6.0 millimeters.

2. A fiberoptic cable marking system comprising:
a plurality of fiberoptic strands, each fiberoptic strand having a free end;
a plurality of groups, each group being formed of a plurality of fiberoptic strands;
a plurality of beads, each bead having a generally cylindrical configuration with an exterior diameter and an interior diameter and an axial length, the plurality of beads including a first bead of a first color encompassing a specific first group of fiberoptic strands adjacent to their free ends, the free ends adapted to be fusion spliced, the plurality of beads including a second bead of the first color encompassing a specific second group of fiberoptic strands adjacent to their free ends, the free ends of the second specific group adapted to be fusion spliced to the free ends of the first specific group, the first and second beads being retained respectively on the first and second specific groups of fiberoptic strands prior to the fusion splicing of the first and second specific groups and also after the fusion splicing of the first and second specific groups with a fusion line between the beads of the groups after the fusion splicing.

3. A fiberoptic cable marking system comprising:
a plurality of fiberoptic strands, each fiberoptic strand having a free end;
a plurality of groups, each group being formed of a plurality of fiberoptic strands;
a plurality of beads, each bead having a generally cylindrical configuration with an exterior diameter and an interior diameter and an axial length, the beads having exterior surfaces of different colors to designate different intended functions; and
a splice tray formed with an operational surface, the operational surface being at an angle with respect to the horizontal and having transverse recesses, each recess having a major section with a smaller arcuate cross section for receiving a group of fiberoptic strands and a laterally extending minor section with a larger arcuate cross section for receiving a bead of a group of fiberoptic strands, the splice tray adapted to support and separate a plurality of groups, each group having fiberoptic strands and a bead.

4. A fiberoptic cable marking system comprising:
a plurality of fiberoptic strands, each fiberoptic strand having a free end;
a plurality of groups, each group being formed of a plurality of fiberoptic strands;
a plurality of beads, each bead having a generally cylindrical configuration with an exterior diameter and an interior diameter and an axial length, the beads having exterior surfaces of different colors to designate different intended functions; and
a kit to facilitate the locating and identifying and marking of fiberoptic groups, the kit including a box having twelve smaller compartments each compartment containing a plurality of beads of a specific color and having a single larger compartment with a tweezers for handling beads and with an instruction sheet including a color chart for the beads and with a marker for marking beads to extend their utility.

5. A fiberoptic cable bead mark system for the locating and identifying and marking of fiberoptic strands in an accurate and efficient manner comprising, in combination:
a plurality of fiberoptic strands, each strand having a free end and with the strands having exterior surfaces of different colors to designate different intended functions;
a plurality of groups, each group being formed of a plurality of fiberoptic strands;
a plurality of cases, each case being formed of a plurality of groups of fiberoptic strands;
a plurality of beads, each bead having a generally cylindrical configuration with an exterior diameter of between about 4.0 millimeters and 6.0 millimeters, an interior diameter of between about 2.0 millimeters and 4.0 millimeters, and an axial length of between about 4.0 millimeters and 6.0 millimeters, the plurality of beads including a first bead of a first color encompassing a specific first group of fiberoptic strands adjacent to their free ends, the free ends adapted to be fusion spliced, the plurality of beads including a second bead of the first color encompassing a specific second group of fiberoptic strands adjacent to their free ends, the free ends of the second specific group adapted to be fusion spliced to the free ends of the first specific group, the first and second beads being retained respectively on the first and second specific groups of fiberoptic strands prior to the fusion splicing of the first and second specific groups and also after the fusion splicing of the first and second specific groups with a fusion line between the beads of the groups after the fusion splicing;
a splice tray formed with an operational surface, the operational surface being at an angle of about 30 degrees with respect to the horizontal and having transverse recesses, each recess having a major section with a smaller arcuate cross section for receiving a group of fiberoptic strands and a laterally extending minor section with a larger arcuate cross section for receiving a bead of a group of fiberoptic strands, the splice tray adapted to support and separate a plurality of groups, each group having fiberoptic strands and a bead; and
a kit to facilitate the locating and identifying and marking of fiberoptic groups, the kit including a box having twelve smaller compartments each compartment containing a plurality of beads of a specific color and having a single larger compartment with a tweezers for handling beads and with an instruction sheet including a color chart for the beads and with a marker for marking beads to extend their utility.

6. A fiberoptic cable marking method comprising:
providing a plurality of fiberoptic strands, each fiberoptic strand having a free end;
providing a plurality of groups, each group being formed of a plurality fiberoptic strands;
providing a plurality of beads, each bead having a generally cylindrical configuration with an exterior diameter and an interior diameter and an axial length, the beads having exterior surfaces of different colors to designate different intended functions;
encompassing a specific first group of fiberoptic strands to be fusion spliced with a first colored bead of a first color;
encompassing a specific second group of fiberoptic strands to be fusion spliced with a second colored bead of the first color; and
retaining first and second beads on the first and second specific groups of fiberoptic strands during fusion splicing of the ends of the first and second specific groups of fiberoptic strands with a fusion line being formed between the first and second beads after the fusion splicing of the first and second specific groups of strands.

* * * * *